A. Kinyon,
Corn Cultivator,
N° 45,503. Patented Dec. 20, 1864.

Witnesses.

Inventor:
A. Kinyon
per Munn & Co
Attorneys.

UNITED STATES PATENT OFFICE.

A. KINYON, OF AMBOY, ILLINOIS.

IMPROVEMENT IN CORN-CULTIVATORS.

Specification forming part of Letters Patent No. 45,503, dated December 20, 1864.

*To all whom it may concern:*

Be it known that I, A. KINYON, of Amboy, in the county of Lee and State of Illinois, have invented a new and Improved Corn-Cultivator; and I do hereby declare that the following is a full, clear, and exact description thereof, which will enable others skilled in the art to make and use the same, reference being had to the accompanying drawings, forming part of this specification, in which—

Figure 1:
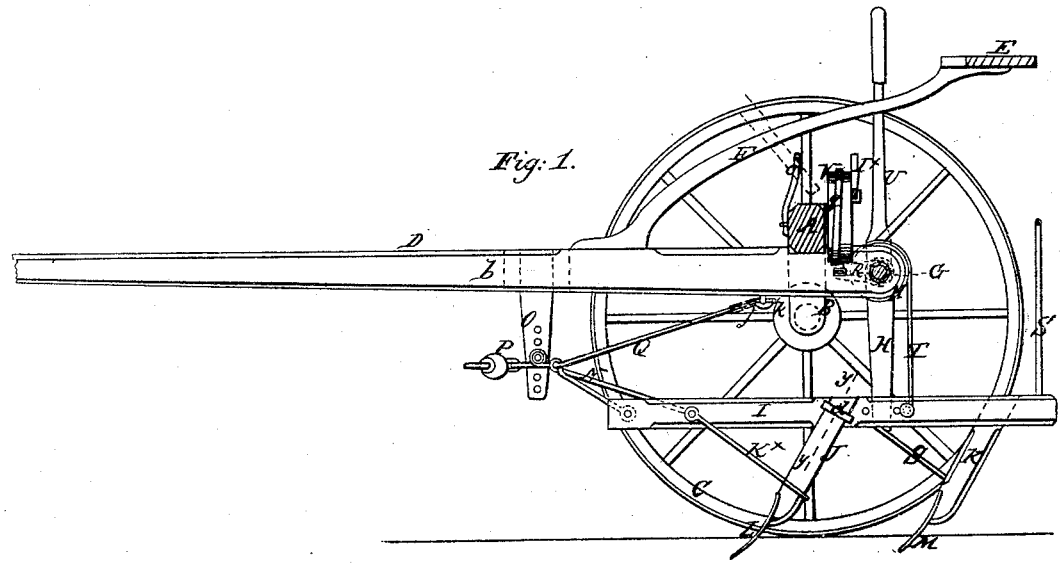
Figure 3:
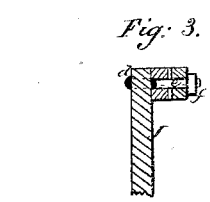
Figure 2:
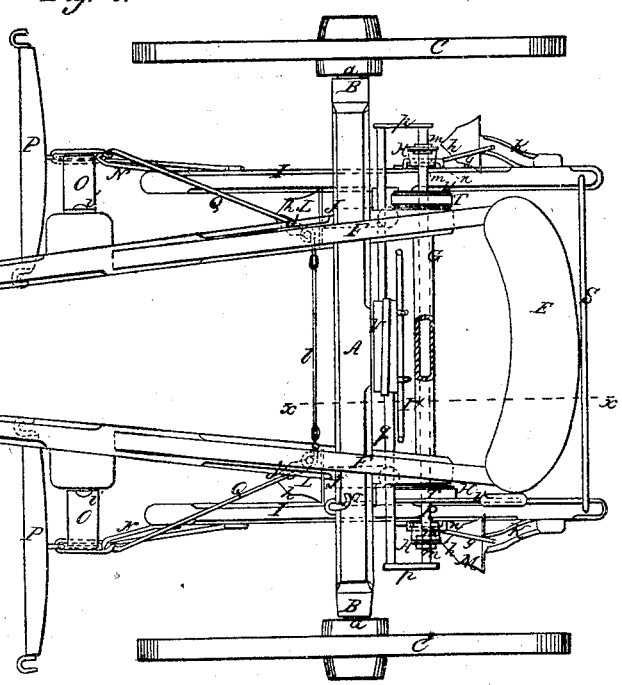

Figure 1 is a side sectional view of my invention, taken in the line $x\ x$, Fig. 2; Fig. 2, a plan or top view of the same; Fig. 3, a section of a portion of the same, taken on the line $y\ y$, Fig. 1.

Similar letters of reference indicate like parts.

This invention relates to a new and improved corn-cultivator of that class in which laterally-moving plows are employed for adjusting the same to the rows of plants, so that they may conform to their sinuosities.

The invention consists in a novel arrangement of the plow-beams, the manner of applying them to the machine, as hereinafter fully set forth, whereby the plows may be raised and lowered, and also adjusted laterally with the greatest facility and a superior draft-equalizing attachment obtained.

A represents the axle of the machine, which is made of wood, and has a bracket, B, secured to each end of it at its under side. These brackets may be of metal, and each is provided with an arm, $a$, on which the wheels C are placed. By this arrangement the axle A is elevated sufficiently to admit of it passing over the growing corn without breaking down or injuring the same.

D represents the draft-pole, which is composed of two parts, $b\ b$, arranged in V form, meeting at the front end and gradually diverging toward the back, the parts $b\ b$ being firmly secured to the axle, near their back ends, by screws or bolts.

E is the driver's seat, which is attached to two inclined elastic supports, F F, the latter being secured one to each part $b$ of the draft-pole a short distance in front of the axle A.

G is a tubular shaft, which has its bearings in the back part of the parts $b\ b$ of the draft-pole, and is provided with a pulley, H, at each end.

I I are two plow-beams, each of which have two standards, J K, secured to it. The front standards, J, are of cylindrical form, and are connected at their upper ends to the beams I I by means of eyes $d$, which are each formed on a screw-rod, $e$, said rods passing through the beams I and having nuts $f$ on their outer ends. By screwing up the nut $f$ the standards J are firmly connected to the beams, said standards being braced from the beams by rods $K^\times$. By unscrewing the nuts $f$ the standards J, and consequently the plows L, may be adjusted higher or lower, as may be desired, and said plows may be adjusted so as to throw the earth either to the right or left (to or from the corn) by simply turning the standards J in the eyes $d$. The back standards, K, are permanently secured to the beams I I, and are braced by rods $g$. The standards K have plows M secured to their lower ends. The plows M are precisely similar to the plows L. They are of pointed form at their lower ends, as shown at $h$, and gradually widen, with a curve to their upper ends, which are straight, and have a horizontal position, as shown in Fig. 2. I do not, however, confine myself to any precise shape or form of plow. The front ends of the beams I I are connected by links N to bent bars O, which are attached at their upper ends to the parts $b\ b$ of the draft-pole by bolts $i$, the bars O being allowed to swing or turn freely on their bolts, and being provided with a series of holes or perforations to admit of the links N being adjusted higher or lower to them, as may be desired.

To the bars O the whiffletrees P are attached, the bent form of the bars keeping the whiffletrees out from the corn so that they cannot injure or break it down. (See Fig. 2.)

Q Q are rods attached one to each bar O, said rods having chains $j$ connected to their back ends, the chains passing around pulleys or pins $k$ at the under sides of the parts $b\ b$ of the draft-pole, and attached at their ends to a rod, $l$. These rods and chains form a draft-equalizer, and take off the strain or pull from the plow-beams in case the plows meet with any obstructions.

Within the tubular shaft G there is fitted loosely a rod, R, which projects some distance beyond the ends of G, and has a screw cut upon it at each end. On the rod R there are two pendants, H H, which may be adjusted nearer to or farther from the ends of the rod R by means of nuts m m. The lower ends of these pendants are fitted with loops n at the sides of the plow-beams, and by adjusting the pendants H H on the rod R the plow-beams I I may be spread a greater or less distance apart, as may be desired. The rear ends of the plow-beams are connected by an elastic semicircular rod, S, and each beam is connected by a strap, T, with a pulley, H, of shaft G. A lever, U, is attached to the shaft G, and by actuating the former the latter may be turned so as to raise and lower the plows, as may be desired, and the plows may be held up out of the ground by shoving the lever forward under a hook, o, attached to the axle A.

To each end of the rod R there is attached an arm, p. These arms extend forward or toward the front end of the machine, and have a strap or cord, q, connected to them, which passes around a pulley, V, at the rear side of the axle A, said pulley having a bar, I, attached to it for the feet of the driver to act upon. By actuating the pulley V the rod R will be moved in a lateral direction relatively with the machine, and the plows L M will be moved in a corresponding direction, so as to conform to the sinuosities of the rows of plants.

The plows, it will be seen, are actuated by the driver from his seat E.

I claim as new and desire to secure by Letters Patent—

1. The tubular shaft G, having the plow-beams I I attached to it by straps T, in connection with the rod R, fitted loosely in said shaft, and connected by pendants H with the beams H, and connected by a strap or cord, q, with a pulley, V, all arranged substantially as shown, to admit of the adjustment of the plows, as set forth.

2. The attaching of the front ends of the plow-beams I I to the parts b b of the draft-pole through the medium of the swinging bent bars O O, connected by a draft-equalizer composed of the rods Q Q, chains j j, rod l, and pulleys or pins k, all arranged substantially as and for the purpose set forth.

3. The securing of the standards J to the beams I by means of the eyes d, screw-rods e, and nuts f, to admit of the adjusting of the plows L, as set forth.

4. Constructing the draft-pole of two parts, b b, arranged in V form and attached to the axle A, as shown, when said pole thus constructed is used in connection with the plow-beams I I, arranged with the mechanism described for adjusting them vertically and laterally, as specified.

A. KINYON.

Witnesses:
N. H. RYAN,
WILLIAM B. ANDRUSS.